April 19, 1932.

F. A. DAY

HEEL BREASTING MACHINE

Re. 18,432

Original Filed Aug. 15, 1928

4 Sheets-Sheet 1

Inventor

F. A. Day

By W. S. McDowell

Attorney

F. A. DAY

April 19, 1932. HEEL BREASTING MACHINE Re. 18,432

4 Sheets-Sheet 2

Original Filed Aug. 15, 1928

Inventor

F. A. Day

By W. S. McDowell

Attorney

April 19, 1932.
F. A. DAY
HEEL BREASTING MACHINE
Re. 18,432
4 Sheets-Sheet 3
Original Filed Aug. 15, 1928
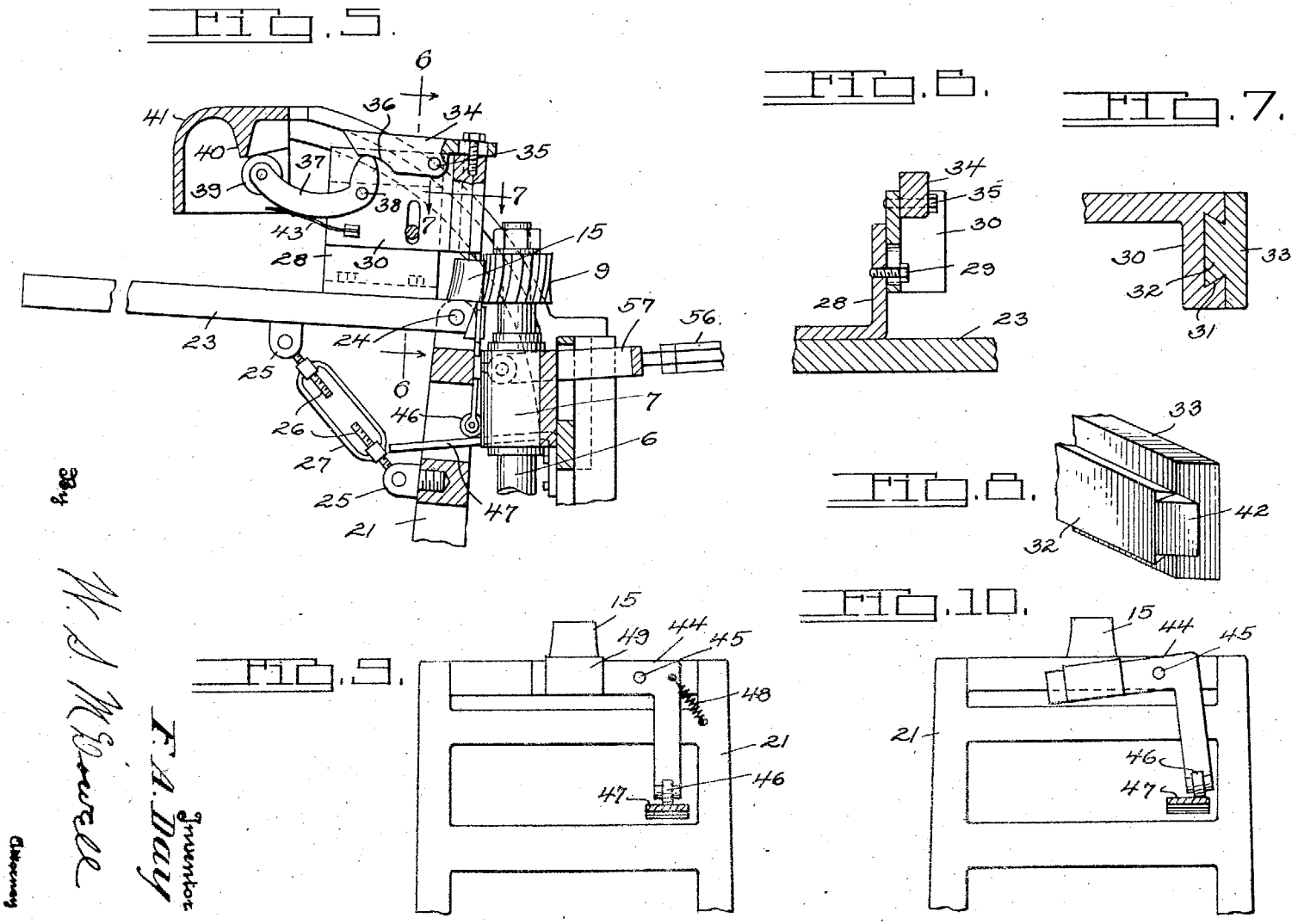
Inventor
F. A. Day
By W. S. McDowell
Attorney

F. A. DAY

April 19, 1932. HEEL BREASTING MACHINE Re. 18,432

4 Sheets-Sheet 4

Original Filed Aug. 15, 1928

Inventor
F. A. Day

By W. S. McDowell

Attorney

Reissued Apr. 19, 1932

Re. 18,432

UNITED STATES PATENT OFFICE

FRED AUSTIN DAY, OF CINCINNATI, OHIO, ASSIGNOR TO UNITED SHOE MACHINERY CORPORATION, OF PATERSON, NEW JERSEY, A CORPORATION OF NEW JERSEY

HEEL BREASTING MACHINE

Original No. 1,807,153, dated May 26, 1931, Serial No. 299,839, filed August 15, 1928. Application for reissue filed February 29, 1932. Serial No. 595,952.

This invention relates to improvements in heel breasting machines, and has for its primary object the provision of a simple yet efficient machine adapted for the purpose of curve breasting wooden heel blanks. Heels of the type employed particularly in connection with women's shoes and particularly that style known as Cuban type of heel include a breast surface which is concave transversely of the heel. Vertically these breasts are convexly curved from the tread to the heel seat. By providing the breast surface of the heel blank with this compound curvature the complete blank heel when finished produces what is known as a straight line effect at the joinder between the breast surface of the heel and the curved or turned sides thereof; that is, the breast corner appears straight when seen from the side.

Heretofore it has been customary to shape the breast surface of a heel blank as above described by arranging the heel blanks on a turnable support so that during the operation of said support the breast surfaces of the heel blanks are presented to the cutting edge of a barrel-saw or crown type of cutter, so that in swinging the support in order to move the heel blank past the cutter there is produced in the breast surfaces of the heel blank the compound curvature set forth, namely, the concave curve horizontally and the convex vertically.

The present invention is directed to an improved machine by means of which this breasting operation may be more expeditiously and efficiently carried out, and wherein the shape of the cutter produces of itself the compound curvature referred to, the holding or supporting means for the heel blanks being entirely independent of the curvature produced on the breast surface of the blank.

Accordingly, the invention provides a heel breasting machine wherein is provided what is known as a "formed" cutter which is shaped to produce both the convex and concave curvature in the breast surface of a heel blank wherein supporting means are provided for moving the heel blank relatively to the cutting face of the cutter by substantially a reciprocating motion in lieu of a rotary or turning motion and wherein the supporting means permit movement of the blank up to the cutter and away from the cutter but not past the same.

With these and other objects in view, which will appear as the description proceeds, this invention consists in the novel features of construction, convenience and arrangements of parts, hereinafter fully described and pointed out in the appended claims.

In the accompanying drawings:

Fig. 3 is an end elevation thereof;

Fig. 5 is a similar view disclosing the heel blank in a clamped position and presented to the action of the formed cutter;

Fig. 6 is a vertical sectional view on the plane indicated on the line 6—6 of Fig. 5;

Fig. 7 is a horizontal sectional view on the line 7—7 of Fig. 5;

Fig. 8 is a detailed perspective view of the movable clamping jaw;

Fig. 9 is a view in side elevation of the pivoted blank gauge showing the latter in its active position;

Fig. 10 is a similar view showing the gauge in its inactive position;

Figure 1:
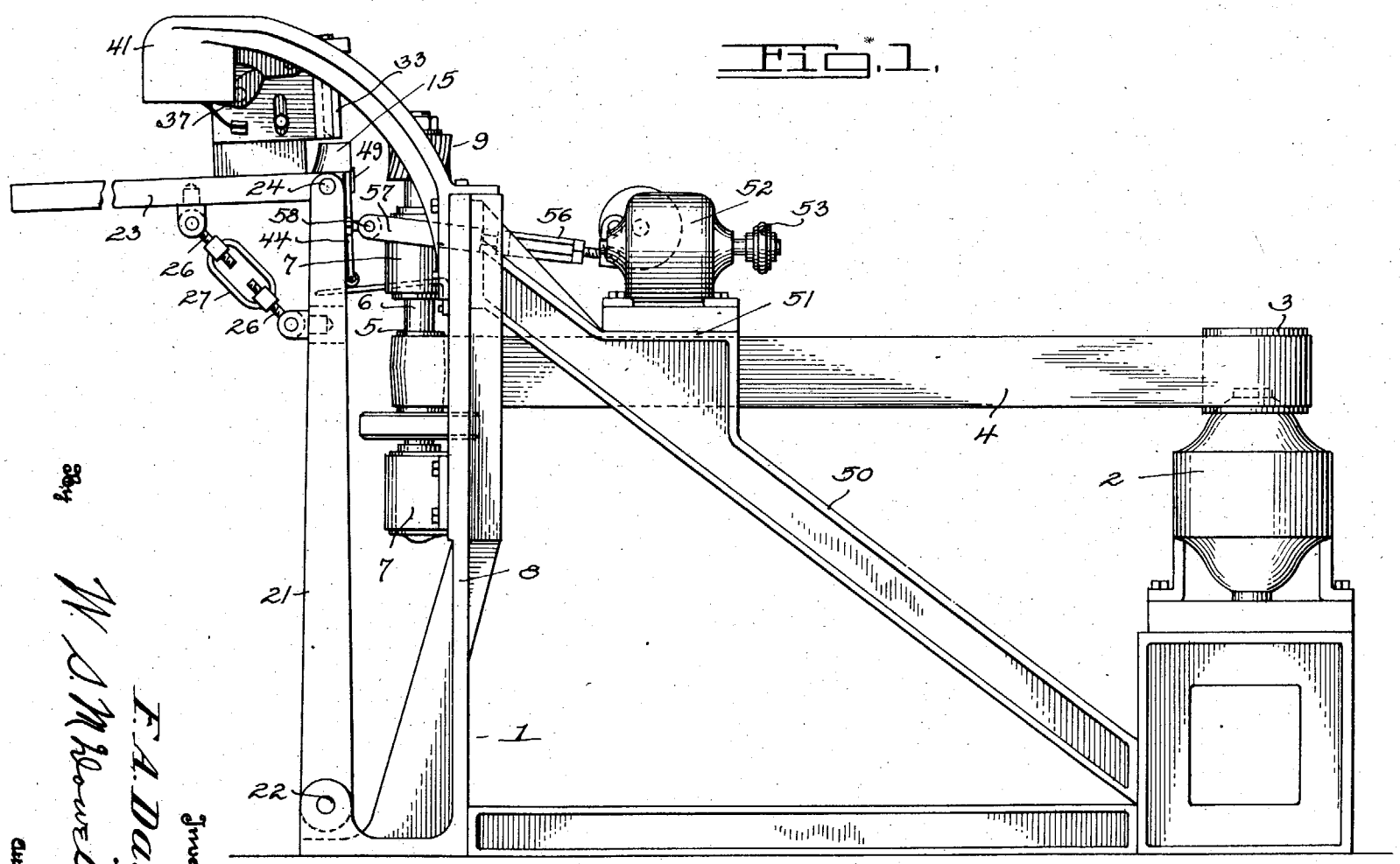
Fig. 1 is a view in side elevation of a heel breasting machine embodying the present invention.
Figure 1:
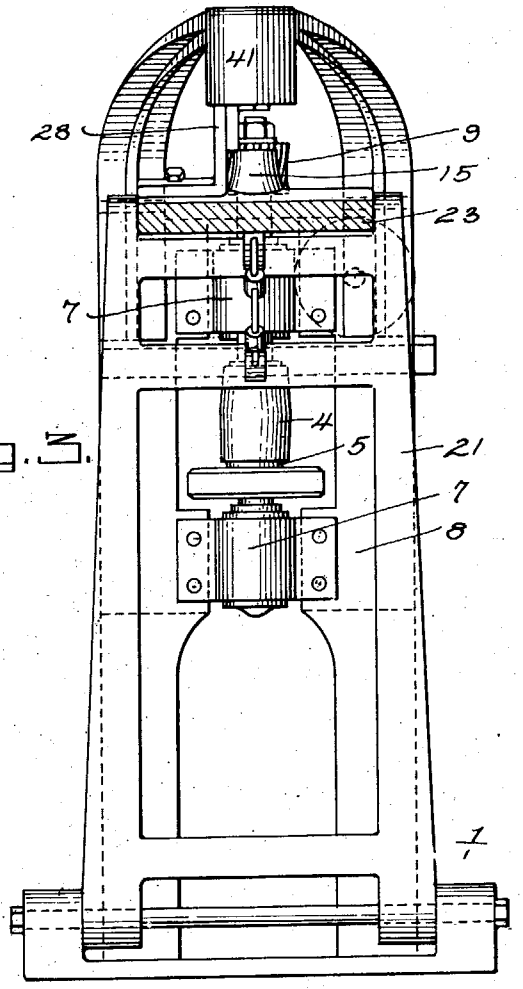
Figure 2:
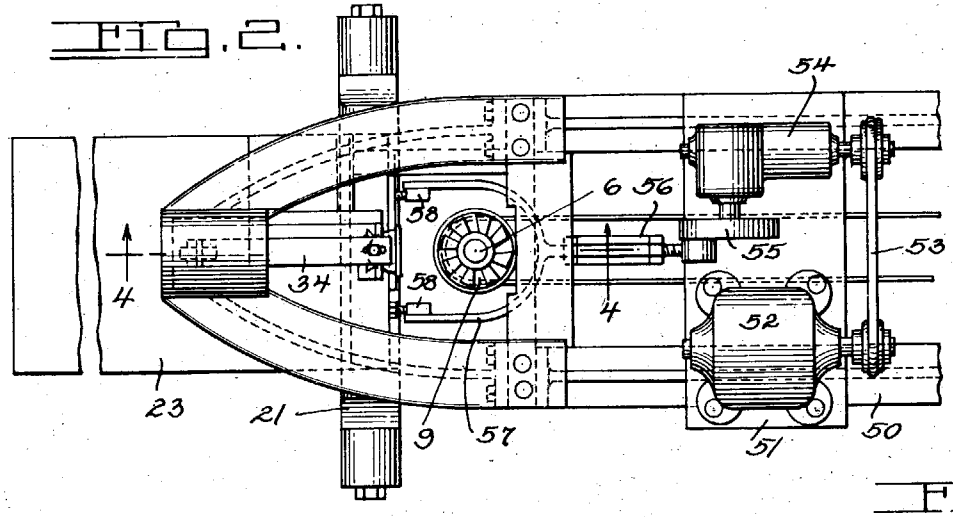
Fig. 2 is a top plan view of said machine.

Referring more particularly to the drawings the numeral 1 designates the frame of the improved heel breasting machine. At one end of the frame there is mounted a vertically disposed motor 2, the shaft of which drives a belt wheel 3. Around this wheel there passes an endless belt 4, which is also passed over a wheel 5 provided upon a vertically disposed cutter shaft 6. This shaft is journaled in connection with bearings 7—7, mounted upon an upright standard 8, which forms a part of the frame 1.

Figure 4:
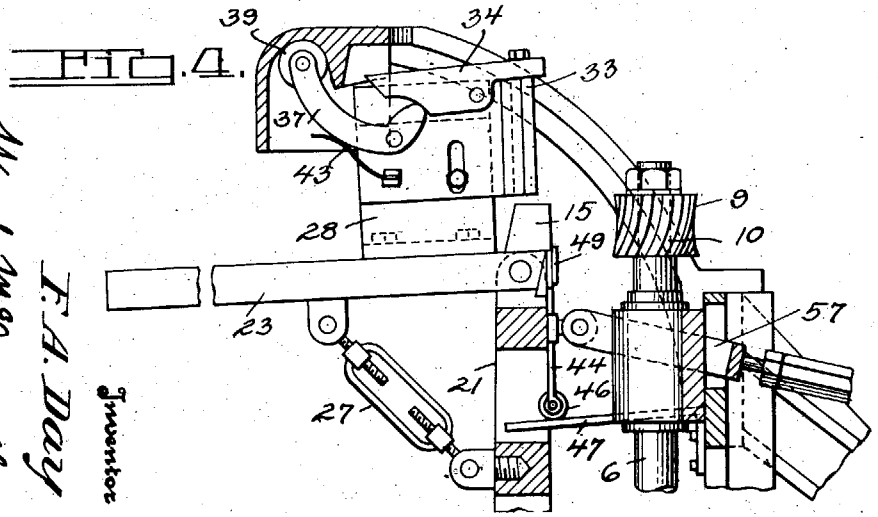
Fig. 4 is a vertical longitudinal view taken through the machine on the plane indicated by the line 4—4 of Fig. 2.
Figure 11:
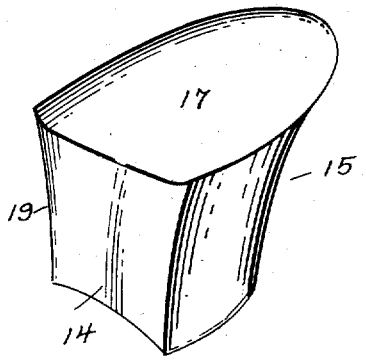
Fig. 11 is a perspective view of a heel blank formed in accordance with the present invention.
Figure 12:
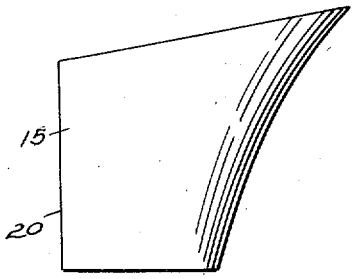
Fig. 12 is a side elevation thereof.
Figure 13:
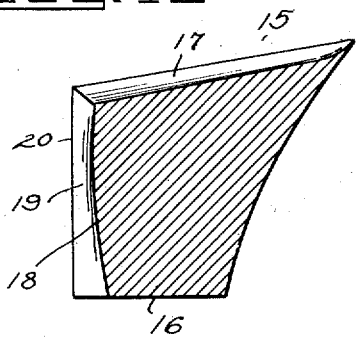
Fig. 13 is a vertical longitudinal sectional view through the heel blank.
Figure 14:
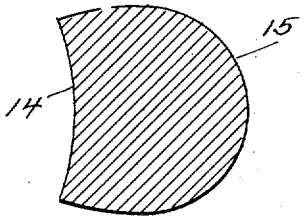
Fig. 14 is a horizontal sectional view through said blank.

The upper end of the shaft 6 carries a removable cutter 9. The illustrated cutter consists of a metal body of tool steel, formed to comprise a plurality of spiral curved cutting blades, the edges 10 of which (Fig. 4) are so shaped that the effective diameter of the lower part of the cutter exceeds that of the middle part of the cutter, the effective diameter of which is also somewhat less than that of the upper part of the cutter, so that when the cutter is viewed in side elevation, as shown in Fig. 4, it presents concave side surfaces. These blades are carefully formed so that the cutter will possess a diameter necessary to produce the horizontally concave cross-sections 14 (Fig. 14) on the breast of a heel blank 15, extending from the heel seat 16 of the heel to the heel top 17. The concave vertical curvature of the cutter, as viewed in Fig. 4, is such as to produce a vertically convex surface as 18 on the heel blank, which surface extends from the heel seat to the heel top. When the heel blank is finished the sides 19 thereof are always curved or turned, as indicated in Figs. 11 to 14, and the cutter is so shaped in relation to the curvature of the sides that the intersections 20 of the sides 19 with the compound curved breast 14, 18, will look substantially straight, as in Fig. 12, when seen from the side. According to the present invention it is to be seen that by moving the heel blank 15 directly into the cutter, the construction of the latter alone produces the compound curvature in said heel surface and that thus the shape of the cut is independent of the means for holding and advancing the heel blanks into engagement with the cutter. As previously stated, this is in marked contrast with machines heretofore developed for effecting this operation. An essential feature of the present invention therefore consists in the shape of the cutter 9. This cutter is removably mounted on the upper end of the shaft 6 to permit convenience in substitution of cutters and to adapt the machine readily to heel blanks of varying sizes and forms.

To engage the heels with the cutter there has been shown a particular type of table or support, although if desired any ordinary form of table may be used which may be situated near the cutter by means of which blanks may be fed by hand into engagement with the cutter. In the present instance, however, the supporting means comprises an upright 21, which is hinged as at 22 at its lower end in connection with the frame 1. I do not limit myself to a hinged construction since the upright may slide, in fact, the length of the upright 21 is such that for all practical purposes the heel blank moves in a substantially straight line into and out of engagement with the cutter.

The upper end of the upright 21 carries a table 23, which is pivotally secured to the upper end of the upright as at 24. Both the table 23 and the upright 21 are provided with fixed brackets 25 to which are secured reversely threaded screws 26. These screws are united by a turn buckle 27, by means of which the operative position of the table in relation to the upright may be operated and maintained.

Mounted on the upper surface of the table 23 is an angle member 28 and to the vertical leg of this member there is secured as at 29 for vertical adjustment a guide member 30. The front wall of his member, as shown in Fig. 7, is provided with a dovetail groove 31, in which is positioned for sliding movement the correspondingly formed rib 32 provided upon a vertically movable clamp 33.

During the time when the heel blank is presented to the action of the cutter 9, the heel blank is clamped in connection with the table 23 by the clamp 33. This is accomplished by loosely connecting with the upper end of the clamp 33 one end of a lever 34, which is pivoted as at 35 on the guide member 30. The rear end of the lever 34 includes a cam surface 36, with which is engaged the short arm of a bell crank lever 37 which is also pivotally mounted as at 38 on the angle member 28.

The outer end of the lever 37 is formed to include a roller 39, which is disposed for engagement with a cam rib 40 provided on the under surface of a stationary frame section 41, the latter being fixed to the stationary upright or standard 8. It will be seen, by reference to Fig. 4, that when the heel blank is spaced from the cutter or when the table 23 occupies an inactive or retracted position, the roller 39 will be located behind the rib 40 but, as shown in Fig. 5, when the table is advanced to bring the heel blank into engagement with the cutter, the roller 39 will pass under the end of the rib and engage with the forward or under side of the rib 40, so as to rock the lever 34 and thereby force the beveled gripping edge 42 of the clamp 33 into secure holding engagement with the heel blank throughout the entire period when the heel blank is being subjected to the action of the rotary and formed cutter. A spring 43 cooperates with the bell crank lever 37 to maintain the roller 39 thereof in constant engagement with the various surfaces of the rib 40.

To govern the positions of the heel blank at the forward end of the table and to control the depth of the cut in the heel blank produced by the cutter there is provided, as shown in Figs. 9 and 10, an adjustable gauge blade 44. This blade is pivotally mounted as at 45 on the swinging upright 21, and the lower end of the blade includes a roller 46, which is adapted to ride upon an inclined blade 47 carried by the standard 8. When the table is moved away from the cutter and the clamping mechanism elevated the gauge blade responding to the influence of a spring 48 moves upwardly so that the removable gauge strip 49 carried thereby projects slightly above the upper and forward edge of the table 23. This projecting portion of the strip 49 serves as a stop against which the operator of the machine may place the heel blank upon which the breast surfacing operation is to be performed. Then, as the table advances to present the heel blank to the cutter the roller 46 riding upwardly upon the inclined blade 47, swings said gauge blade so that the strip 49 will be positioned below the upper edge of the table, as shown in Fig. 10, and out of the way of the cutter proper. The gauge blade assumes the position shown in Fig. 10 during the entire period of engagement between the heel blank and the cutter.

To effect the automatic advance and return movement of the work-supporting table, there is mounted upon the inclined struts 50 of the frame 1 a bed plate 51. Mounted on the bed plate 51 is a motor 52, whose shaft is provided with a pulley. From this pulley there is passed a belt 53 which leads to a speed reducing mechanism 54, also mounted on the bed plate 51. The driving shaft of the mechanism 54 includes a disc 55 to which is eccentrically secured an adjustable strap 56, the latter having its forward end connected with a U-shaped yoke 57, which surrounds the shaft 6, and the forward ends of the yoke 57 are pivotally connected with the upright 21 as indicated at 58. It will be seen that by adjustment between the disc 55 and the strap 56, the throw or movement of the table may be regulated to control the depth of the cut produced in the blank. Another adjustment is secured by the turn buckle 27 for the purpose of angularly adjusting the position of the heel blank in relation to the cutter. These combined adjustments adapt practically any type of Cuban heel to the machine. A third adjustment is of course secured by changing the shape of the cutter 9. These cutters are so formed that they can be readily applied to or removed from the upper end of the shaft 6.

In view of the foregoing it will be seen that by virtue of the construction designated a simple and improved machine is provided for breasting a heel blank to produce straight appearing breast edges on such a heel blank where the sides of the blank meet the breast surface thereof. It will be understood that the heel blanks may be placed by hand on the supporting table in engagement with the gauge strip 49 and that after the breasting operation has been completed, the finished blank may be removed from the table by the operator and another blank placed thereon. An essential feature of the present invention resides in the construction of the cutter which is formed or shaped so that of itself the convex and concave curvature is provided in the heel blank. I prefer to form the blades of the cutter in the helical or spiral manner indicated, for the reason that the blades will thus engage the wooden heel blank more properly or effectively so that the latter is cut or curved as desired without injury, such as splitting or roughly finishing the breast surface of the wooden heel. In this connection it should be observed that the shaft 6 revolves at very high speed and this fact, taken in connection with the shape of the cutter, enables the machine to produce on the breast surface of a heel blank, a curved or formed surface as indicated characterized by its smooth finish, absense of roughness and other imperfections which have heretofore required an additional sanding or buffing operation.

Having described my invention, what I claim as new and desire to secure by Letters Patent of the United States is:

1. In a heel breasting machine, a rotatively mounted cutter, said cutter being formed to comprise a body which carries a plurality of rigidly mounted cutting blades, said blades being disposed in circular order about said body and extending longitudinally and helically with respect to said body, the cutting edges of said blades being curved arcuately so that one end of said cutter possesses greater diameter than the opposite end.

2. In a heel breasting machine, a rotary cutter formed to comprise a body from which rigidly projects a plurality of circularly arranged cutting blades which extend longitudinally and helically of the cutter, said blades being provided with concave cutting edges so that the diameter of the cutter at one end thereof exceeds the diameter of the intermediate portion of said cutter.

3. In a heel breasting machine, a frame, a cutter rotatively mounted in connection with said frame, a work support movable with respect to said frame and cutter, gauge means for determining the operative position of a heel blank on said work support, means for moving said work support toward and from said cutter to present the breast surface of a heel blank carried thereby to said cutter to a predetermined extent, means automatically operable to retain a heel blank in a stationary position on said work support when the heel blank is presented to the cutter, said cutter being so shaped as to produce a convex curve in the breast surface of the heel blank vertically and a concave curve horizontally, and means for rotating said cutter.

4. In a heel breasting machine, a frame, a cutter mounted for rotation in connection with said frame and revoluble about a stationary vertical axis, a pivotally mounted table movable relatively to said frame and cutter gauge means arranged at one end of said table for determining the position of a heel blank thereon, means for oscillating said table to present the breast surface of a heel blank carried thereby to said cutter, automatic means for clamping the heel blank to said table when the heel blank is engaged by said cutter, and means for positively moving the gauging means to an inactive position during engagement between the heel blank and cutter.

5. In a heel breasting machine, a rotary cutter formed to comprise a body from which rigidly projects a plurality of circularly arranged cutting blades which extend longitudinally and helically of the cutter, said blades being provided with concave cutting edges so that the diameter of the cutter at each end thereof exceeds the diameter of the intermediate portion of said cutter.

6. In a heel breasting machine, a rotatably mounted cutter, said cutter being formed to comprise a body which carries a plurality of rigidly mounted cutting blades, said blades being disposed in circular order about said body and extending longitudinally and helically with respect to said body, the cutting edges of said blades being so shaped that the intermediate portion of said cutter possesses a diameter less than the ends of said cutter.

7. In a heel breasting machine, a rotary cutter shaped to generate a surface of revolution which is concave in sections taken parallel to its axis of rotation, and is convex in sections taken perpendicular to said axis, a heel blank holder arranged to present a heel blank to the cutter with its vertical axis generally parallel to the axis of rotation of the cutter, and its breast surface toward the cutter and means for relatively moving the blank holder and cutter toward each other to cut a surface on the breast of the heel blank which is convex in vertical longitudinal cross-section and concave in horizontal cross-section.

8. In a heel breasting machine, a rotary cutter shaped to generate a surface of revolution which is concave in sections taken parallel to its axis of rotation, and is convex in sections taken perpendicular to said axis, a heel blank holder arranged to present a heel blank to the cutter with its vertical axis generally parallel to the axis of rotation of the cutter, and its breast surface toward the cutter, and means for relatively moving the blank holder and cutter toward each other in a direction transverse to the two said axes to cut a surface on the breast of the heel blank which is convex in vertical longitudinal cross-section and concave in horizontal cross-section.

9. In a heel breasting machine, a rotary cutter shaped to generate a surface of revolution which is concave in sections taken parallel to its axis of rotation, and is convex in sections taken perpendicular to said axis, a heel blank holder arranged to present a heel blank to the cutter with its vertical axis generally parallel to the axis of rotation of the cutter, and its breast surface toward the cutter, and means for relatively moving the blank holder and cutter toward each other in a direction transverse to the two said axes to cut a surface on the breast of the heel blank which is convex in vertical longitudinal cross-section and concave in horizontal cross-section, the shape of the said surface of revolution of the cutter being predetermined in connection with the desired curvature of the side of the finished blank, to form a breast corner on the finished heel blank which is substantially straight when viewed from the side.

In testimony whereof I have signed my name to this specification.

FRED AUSTIN DAY.